(12) United States Patent
Nettles

(10) Patent No.: US 11,305,596 B2
(45) Date of Patent: Apr. 19, 2022

(54) COMMERCIAL CHAIN BLOCK SYSTEM

(71) Applicant: Eric Jean Alfred Nettles, Coarsegold, CA (US)

(72) Inventor: Eric Jean Alfred Nettles, Coarsegold, CA (US)

( * ) Notice: Subject to any disclaimer, the term of this patent is extended or adjusted under 35 U.S.C. 154(b) by 168 days.

(21) Appl. No.: 16/663,330

(22) Filed: Oct. 24, 2019

(65) Prior Publication Data

US 2020/0198418 A1  Jun. 25, 2020

Related U.S. Application Data

(60) Provisional application No. 62/783,101, filed on Dec. 20, 2018.

(51) Int. Cl.
*B60C 7/24* (2006.01)
*B60C 27/00* (2006.01)
*B66F 7/24* (2006.01)

(52) U.S. Cl.
CPC ............ *B60C 27/003* (2013.01); *B66F 7/243* (2013.01); *B60C 2200/04* (2013.01)

(58) Field of Classification Search
CPC .... B60C 27/003; B60C 2200/04; B66F 7/243
See application file for complete search history.

(56) References Cited

U.S. PATENT DOCUMENTS

| | | | |
|---|---|---|---|
| 1,262,930 A * | 4/1918 | Diaz | E01C 9/00 404/71 |
| 2,272,334 A * | 2/1942 | St Laurent | B66F 7/243 254/88 |
| 4,031,939 A | 6/1977 | De Martini | |
| 4,058,292 A * | 11/1977 | Goodrich | B60S 11/00 254/88 |
| 4,194,724 A | 3/1980 | Masegian | |
| 4,341,371 A * | 7/1982 | Rotella | B66F 7/243 14/69.5 |
| 4,371,298 A * | 2/1983 | Van Iperen | B60P 3/073 254/88 |
| 5,176,361 A * | 1/1993 | Ayala, III | B66F 7/243 254/88 |
| 5,219,466 A | 6/1993 | Stout | |
| 6,148,887 A | 11/2000 | Ahne | |
| 7,003,836 B2 * | 2/2006 | Berg | B66F 7/243 14/69.5 |
| 8,978,519 B2 | 3/2015 | Hard | |
| 9,868,622 B1 * | 1/2018 | Turner | B60T 3/00 |
| 2006/0043350 A1 * | 3/2006 | Branstetter | B66F 7/243 254/88 |
| 2008/0201873 A1 * | 8/2008 | Haimoff | B66F 7/243 14/69.5 |
| 2015/0246798 A1 * | 9/2015 | Guzman Restori | B66F 7/243 14/72.5 |

* cited by examiner

*Primary Examiner* — Scott A Browne
(74) *Attorney, Agent, or Firm* — Michael L. Greenberg, Esq.; Greenberg & Lieberman, LLC

(57) ABSTRACT

A commercial chain block system is disclosed herein including a block assembly including an elongated platform supported by a first-support-leg, and a second-support-leg extending lengthwise along opposing sides of the platform. The first-support-leg and the second-support-leg have a ramp at one end forming a 45 degree angle. The platform, the first-support-leg, and the second-support-leg are configured to support a tire of a vehicle upon a top-surface of the platform and assist in installing chains on tires of commercial vehicles.

1 Claim, 5 Drawing Sheets

COMMERCIAL CHAIN BLOCK SYSTEM

CROSS REFERENCE TO RELATED APPLICATION

The present application is related to and claims priority to U.S. Provisional Patent Application No. 62/783,101 filed Dec. 20, 2018, which is incorporated by reference herein in its entirety.

BACKGROUND OF THE INVENTION

The following includes information that may be useful in understanding the present disclosure. It is not an admission that any of the information provided herein is prior art nor material to the presently described or claimed inventions, nor that any publication or document that is specifically or implicitly referenced is prior art.

1. Field of the Invention

The present invention relates generally to the field of ramps and blocks and more specifically relates to tire blocks.

2. Description of Related Art

It's not only difficult and time consuming to apply chains to commercial truck tires in bad weather, but it's also dangerous when doing so on the side of the road. Additionally, the longer truck drivers struggle with the application, the longer they're exposed to the harsh elements. Some drivers may simply give up and wait for the winter storm to pass, but this can put them behind schedule, which may lead to unhappy clients. A suitable solution is desired.

U.S. Pat. No. 4,194,724 to Gregory Masegian relates to a chainmate. The described chainmate includes a wooden block, upon which an automobile wheel can climb, to facilitate tire chain installation, the block including an inclined ramp at one end, and a pair of transverse grooves across its top for receiving the chain; and the block, in a modified design, including a warning bell, so a wheel does not roll off the opposite end of the block.

BRIEF SUMMARY OF THE INVENTION

In view of the foregoing disadvantages inherent in the known ramps and blocks art, the present disclosure provides a novel commercial chain block system. The general purpose of the present disclosure, which will be described subsequently in greater detail, is to provide a safe, quick, and convenient way to apply chains to commercial vehicles.

A commercial chain block system is disclosed herein. The commercial chain block system includes a block assembly including an elongated platform having a top-surface, a bottom-surface, a first-side, a second-side, a front-side, and a rear-side, a first-support-leg, and a second-support-leg. The block assembly comprises the substantially flat elongated platform having the top-surface and the bottom-surface which is defined by the first-side, the second-side, the front-side, and the rear-side. The first-support-leg extends lengthwise along the first-side, the second-support-leg extends lengthwise along the second-side. The first-support-leg and the second-support-leg support the platform in an elevated position. An open cavity is formed below the platform between the first-support-leg and the second-support-leg. The first-support-leg and the second-support-leg each comprise a first-end and a second-end, the first-end comprises a ramp having a 45 degree angle. The platform, the first-support-leg, and the second-support-leg are configured to support a tire of a vehicle upon the top-surface of the platform and assist in installing at least one chain on the tire of a commercial vehicle.

For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein. The features of the invention which are believed to be novel are particularly pointed out and distinctly claimed in the concluding portion of the specification. These and other features, aspects, and advantages of the present invention will become better understood with reference to the following drawings and detailed description.

BRIEF DESCRIPTION OF THE DRAWINGS

The figures which accompany the written portion of this specification illustrate embodiments and methods of use for the present disclosure, a commercial chain block system, constructed and operative according to the teachings of the present disclosure.

The various embodiments of the present invention will hereinafter be described in conjunction with the appended drawings, wherein like designations denote like elements.

DETAILED DESCRIPTION

As discussed above, embodiments of the present disclosure relate to ramps and blocks and more particularly to a commercial chain block system as used to improve the application of chains to tires of commercial vehicles.

Generally, the present invention provides a safe, quick, and convenient way to apply chains to commercial vehicles. The product prevents drivers from struggling on the side of the road to apply chains, which is dangerous, frustrating, and uncomfortable. It eliminates the need to sit in a truck and wait for a snowstorm to pass. The product saves drivers a considerable amount of time and frustration.

The present invention helps drivers arrive promptly at their destination, keeping schedules on track commercial chain block system simplifies the process of applying chains to commercial vehicles, offering drivers maximum safety and convenience. This innovative product features a 4×4 block with a top surface for supporting a tire. On either side of the block, secured together with a screw or nail, can be two 2×4 blocks with a 45-degree ramp-like design on one end. Extending down the middle of the 4×4 block can be a steel chain. The chain can hold the block in place once the tire rolls onto the block. The 4×4 block measures approximately 15" in length and the 2×4 blocks measure about 21" in length.

Figure 1:
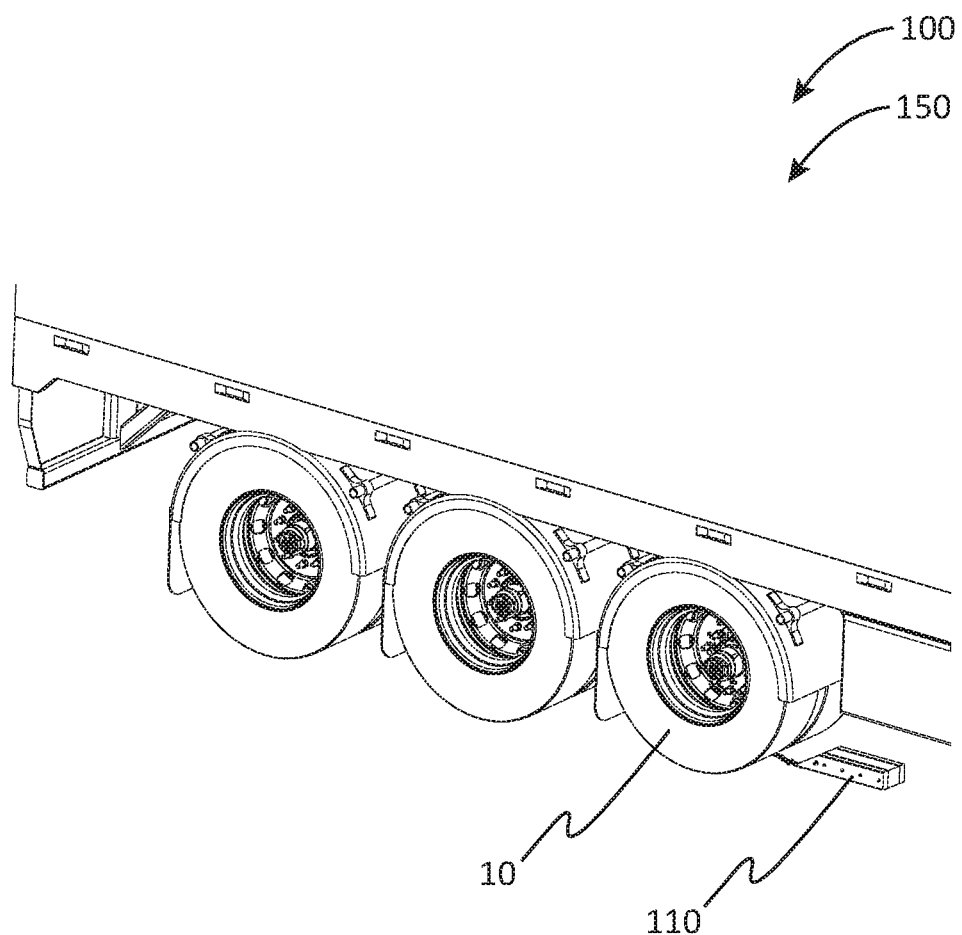
FIG. 1 is a perspective view of the commercial chain block system during an 'in-use' condition, according to an embodiment of the disclosure.

Referring now more specifically to the drawings by numerals of reference, there is shown in FIGS. 1-5, various views of a commercial chain block system 100. FIG. 1 shows a commercial chain block system 100 during an 'in-use' condition 150, according to an embodiment of the present disclosure. As illustrated, the commercial chain block system 100 may include a block assembly 110 including an elongated platform 112 having a top-surface 114, a bottom-surface 116, a first-side 118, a second-side 120, a front-side 122, and a rear-side 124, a first-support-leg 130, and a second-support-leg 140. The block assembly 110 comprises the substantially flat elongated platform 112 having the top-surface 114 and the bottom-surface 116 which is defined by the first-side 118, the second-side 120, the front-side 122, and the rear-side 124. The first-support-leg 130 extends lengthwise along the first-side 118 and the second-support-leg 140 extends lengthwise along the second-side 120. The first-support-leg 130 and the second-support-leg 140 support the platform 112 in an elevated position. An open cavity is formed below the platform 112 between the first-support-leg 130 and the second-support-leg 140. The first-support-leg 130 and the second-support-leg 140 each comprise a first-end 160 and a second-end 162. The first-end 160 comprises a ramp 164. The platform 112, the first-support-leg 130, and the second-support-leg 140 are configured to support a tire 10 of a vehicle upon the top-surface 114 of the platform 112 and, in some embodiments, assist in installing at least one chain on the tire 10.

Figure 2:
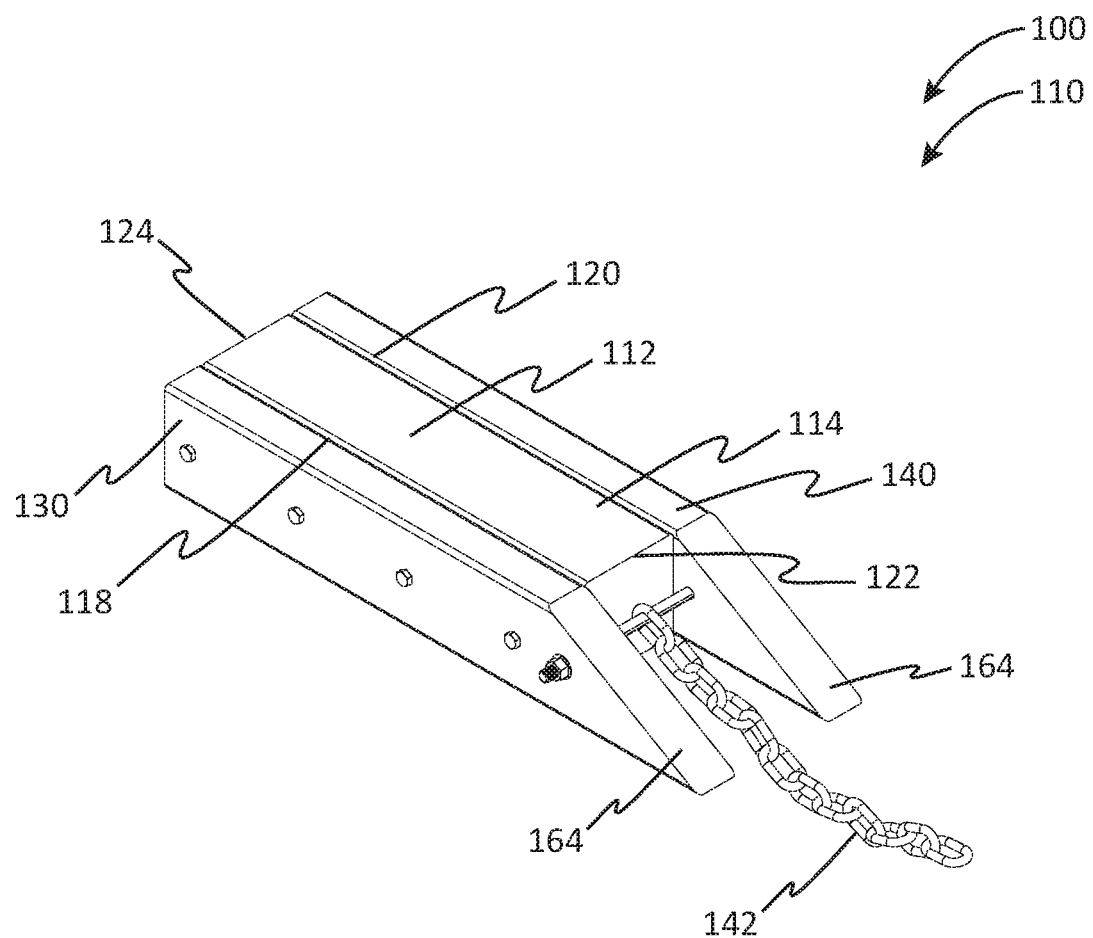
FIG. 2 is a perspective view of the commercial chain block system of FIG. 1, according to an embodiment of the present disclosure.

FIG. 2 shows a perspective view of the commercial chain block system 100 of FIG. 1, according to an embodiment of the present disclosure. As above, the commercial chain block system 100 may include the block assembly 110 including the elongated platform 112 supported by the first-support-leg 130 and the second-support-leg 140. The platform 112 comprises a four-by-four block measuring 4 inches by 4 inches. The first-support-leg 130 and the second-support-leg 140 each comprise a two-by-four block measuring 2 inches by 4 inches. The platform 112, the first-support-leg 130, and the second-support-leg 140 are permanently affixed via at least one fastener such as nails or screws thereby forming a single piece unit. Other suitable fastening means may be used.

Figure 3:
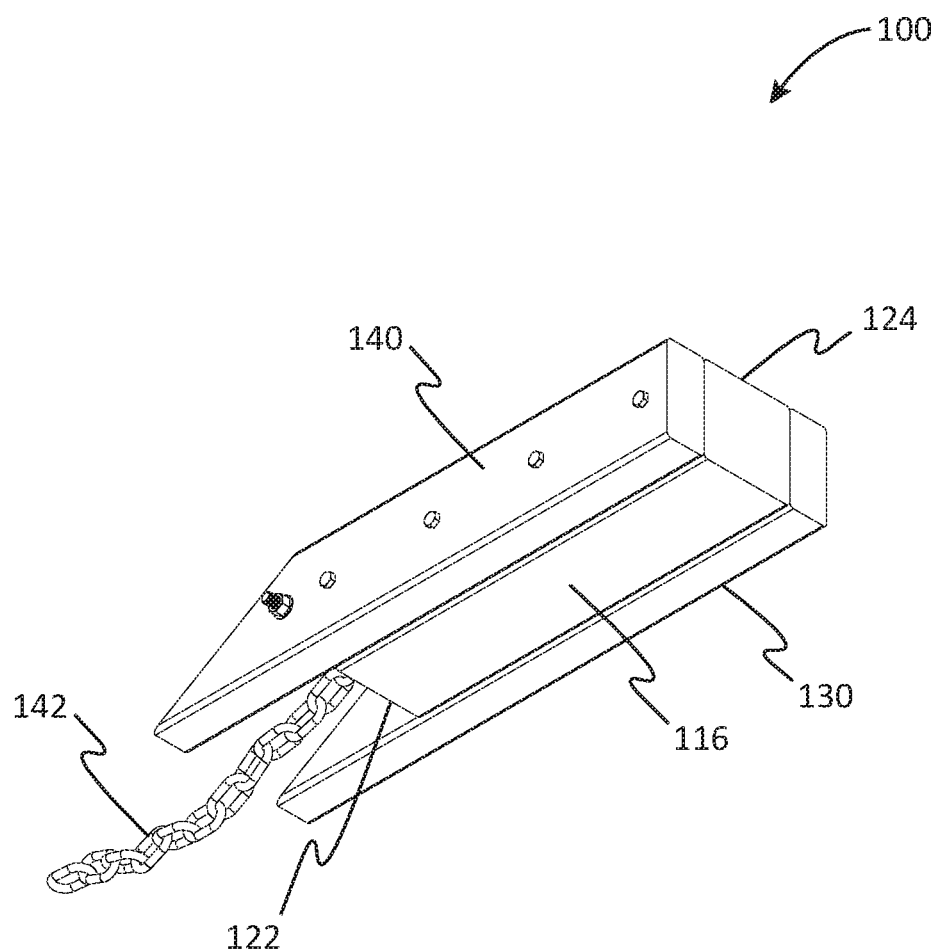
FIG. 3 is a perspective view of the commercial chain block system of FIG. 1, according to an embodiment of the present disclosure.

FIG. 3 shows a perspective view of the commercial chain block system 100 of FIG. 1, according to an embodiment of the present disclosure. As above, the commercial chain block system 100 may include the block assembly 110 including the elongated platform 112 having the top-surface 114, the bottom-surface 116, the first-side 118, the second-side 120, the front-side 122, and the rear-side 124 and the first-support-leg 130, and the second-support-leg 140. The block assembly 110 further comprises a chain 142, sometimes steel, providing traction to prevent relative movement of the tire 10 of the vehicle. Another way of saying this is that as the vehicle wheel or tire 10 moves up or against ramp 164, chain 142 is trapped between the ground and tire 10 which prevents tire 10 from pushing ramp 164. Instead, tire 10 rolls up ramp 164, as intended. The steel chain 142 is positionable lengthwise along a center point of the platform 112. In a preferred embodiment, the platform 112 is approximately 15 inches long and the first-support-leg 130 and the second-support-leg 140 are approximately 21 inches long.

The ramp 164 of first-support-leg 130 and the second-support-leg 140 extend past the front-side 122 of the platform 112. The ramp 164 of the first-support-leg 130 and the second-support-leg 140 comprise a 45 degree angle. The second-end 162 of the first-support-leg 130 and the second-support-leg 140 are non-angled. In some versions the chain 142 is replaced by a rope or a strip, such as a nylon rope or a metal strip. In some version chain 142 attaches to block assembly 110 through a connection spanning the first-support-leg 120 and second-support-leg 140. In other versions chain 142 attaches to block assembly 110 through a connection to elongated platform 112, such as by using an eyebolt or hook extending out from elongated platform 112, between the first-support-leg 120 and second-support-leg 140. In some embodiments, the opposite end of chain 142 attaches to a hook or other connection on the elongated platform 112, sometimes at the opposite end of elongated platform 112.

Figure 4:
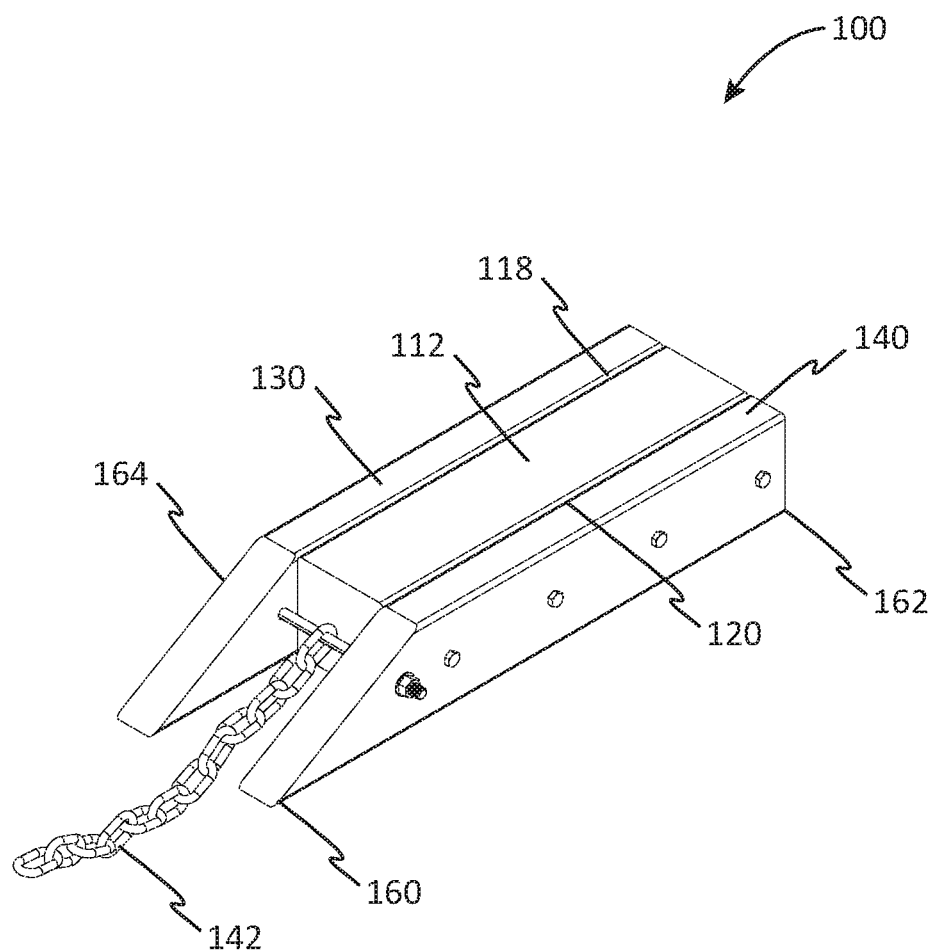
FIG. 4 is a perspective view of the commercial chain block system of FIG. 1, according to an embodiment of the present disclosure.

FIG. 4 shows a perspective view of the commercial chain block system 100 of FIG. 1, according to an embodiment of the present disclosure. As above, the commercial chain block system 100 may include the block assembly 110 having a substantially planar platform 112 supported by the first-support-leg 130 and the second-support-leg 140. The block assembly 110 is adapted to be placed on a planar supporting surface during a process of installing chains to tires 10 of a commercial semi-truck vehicle. In a preferred embodiment, the platform 112, the first-support-leg 130, and the second-support-leg 140 comprise wood. Other suitable alternative materials may be used. The block assembly 110 further comprises a second-platform 170 configured to be used in conjunction with a first-platform 172. The second-platform 170 and the first-platform 172 comprise identical profiles.

Figure 5:
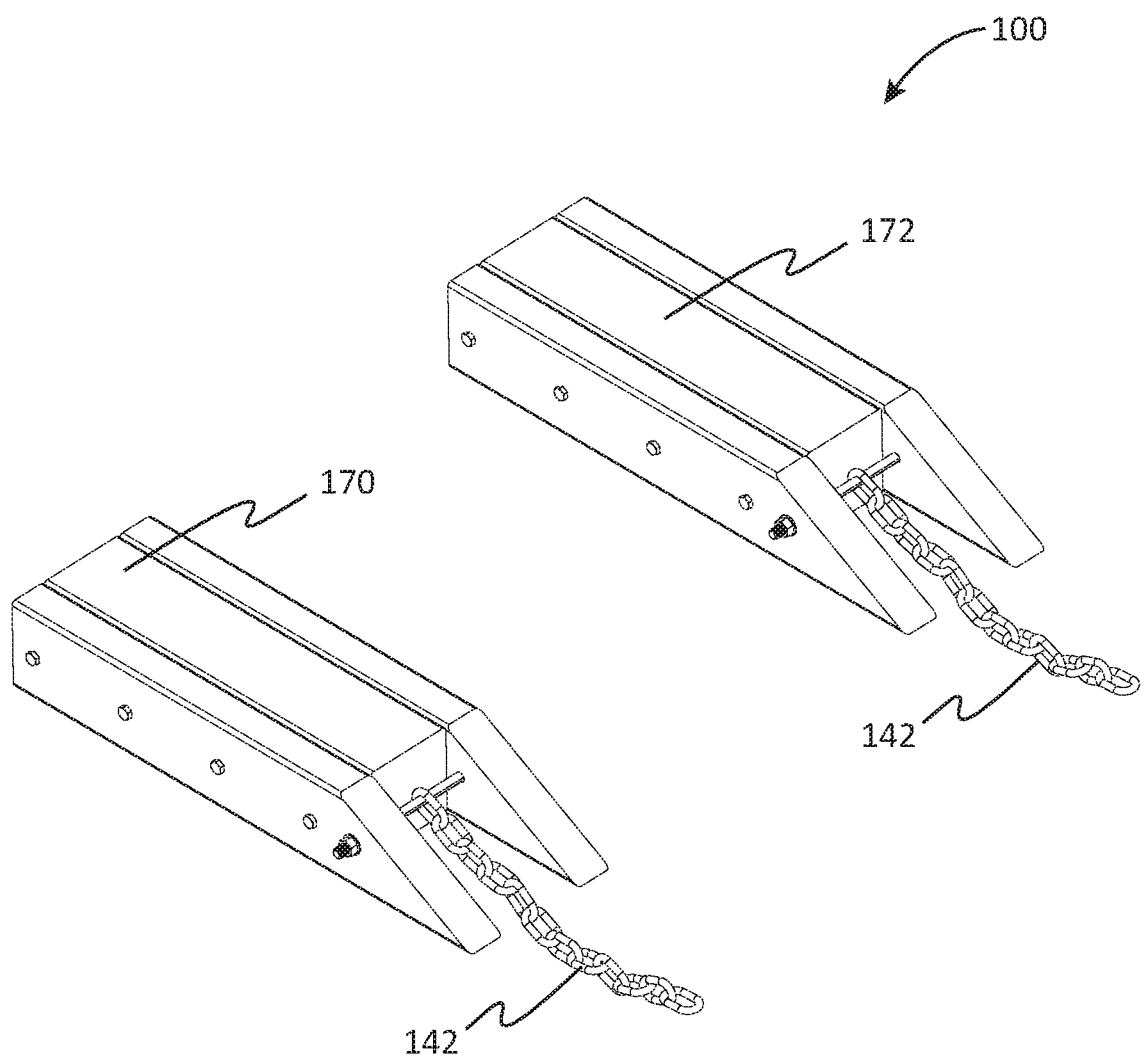
FIG. 5 is a perspective view of the commercial chain block system of FIG. 1, according to an embodiment of the present disclosure.

According to one embodiment, the commercial chain block system 100 as shown in FIG. 5, may be arranged as a kit. The kit may include a first-platform 172 and a second-platform 170 configured to be used in conjunction with the first-platform. The instructions may detail functional relationships in relation to the structure of the commercial chain block system 100 (such that the commercial chain block system 100 can be used, maintained, or the like, in a preferred manner).

The embodiments of the invention described herein are exemplary and numerous modifications, variations and rearrangements can be readily envisioned to achieve substantially equivalent results, all of which are intended to be embraced within the spirit and scope of the invention. Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application.

What is claimed is new and desired to be protected by Letters Patent is set forth in the appended claims:

1. A commercial chain block system, the commercial chain block system comprising:
  a block assembly including;
    an elongated platform having;
      a top-surface;
      a bottom-surface;
      a first-side;
      a second-side;
      a front-side; and
      a rear-side;

a first-support-leg; and
a second-support-leg;
wherein said block assembly comprises said elongated platform having said top-surface and said bottom-surface which is defined by said first-side, said second-side, said front-side, and said rear-side;
wherein said first-support-leg extends lengthwise along said first-side, said second-support-leg extends lengthwise along said second-side;
wherein said first-support-leg and said second-support-leg support said platform in an elevated position, an open cavity is formed below said platform between said first-support-leg and said second-support-leg;
wherein said first-support-leg and said second-support-leg each comprise a first-end and a second-end, said first-end comprises a ramp;
wherein said platform, said first-support-leg, and said second-support-leg are configured to support a tire of a vehicle upon said top-surface of said platform and assist in installing at least one chain on said tire;
wherein said platform comprises a four-by-four block measuring 4 inches by 4 inches;
wherein said first-support-leg and said second-support-leg each comprise a two-by-four block measuring 2 inches by 4 inches;
wherein said platform, said first-support-leg, and said second-support-leg are permanently affixed via at least one fastener thereby forming a single piece unit;
wherein said platform is 15 inches long;
wherein said first-support-leg and said second-support-leg are 21 inches long;
wherein said ramp of first-support-leg and said second-support-leg extend past said frontside of said platform;
wherein said ramp of said first-support-leg and said second-support-leg comprise a 45 degree angle;
wherein said second-end of said first-support-leg and said second-support-leg are nonangled;
wherein said block assembly is adapted to be placed on a planar supporting surface;
wherein said platform is substantially planar;
wherein said platform, said first-support-leg, and said second-support-leg comprise wood;
wherein said block assembly further comprises a second-platform configured to be used in conjunction with a first-platform;
wherein said second-platform and said first-platform comprise identical profiles;
wherein said vehicle is a commercial semi truck;
wherein said block assembly further comprises a steel chain providing traction to prevent relative movement of said tire of said vehicle; and
wherein said steel chain is positionable lengthwise along a center point of said platform.

* * * * *